United States Patent
Soma et al.

(10) Patent No.: US 8,004,218 B2
(45) Date of Patent: Aug. 23, 2011

(54) DRIVE DEVICE FOR VEHICLE

(75) Inventors: Takaya Soma, Toyota (JP); Hiroshi Yoshida, Anjo (JP); Takeshi Mogari, Nagoya (JP); Hiroki Sawada, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 421 days.

(21) Appl. No.: 12/308,860

(22) PCT Filed: Jul. 5, 2007

(86) PCT No.: PCT/JP2007/063874
§ 371 (c)(1),
(2), (4) Date: Dec. 24, 2008

(87) PCT Pub. No.: WO2008/015894
PCT Pub. Date: Feb. 7, 2008

(65) Prior Publication Data
US 2009/0230908 A1    Sep. 17, 2009

(30) Foreign Application Priority Data
Jul. 31, 2006 (JP) .................................. 2006-208276

(51) Int. Cl.
*H02P 1/54* (2006.01)
*H02P 5/00* (2006.01)
*H02P 5/46* (2006.01)

(52) U.S. Cl. ....... 318/105; 318/139; 318/146; 180/65.1; 180/65.21; 180/170

(58) Field of Classification Search .................. 318/105, 318/139, 146; 180/65.1, 65.21, 170
See application file for complete search history.

(56) References Cited

U.S. PATENT DOCUMENTS

| | | | | |
|---|---|---|---|---|
| 5,376,869 A | * | 12/1994 | Konrad | 318/587 |
| 6,321,144 B1 | * | 11/2001 | Crombez | 701/22 |
| 6,549,840 B1 | * | 4/2003 | Mikami et al. | 701/69 |
| 2008/0190680 A1 | * | 8/2008 | Kaneko et al. | 180/170 |

FOREIGN PATENT DOCUMENTS

| | | |
|---|---|---|
| JP | A-09-065504 | 3/1997 |
| JP | A-09-266601 | 10/1997 |
| JP | A-2000-092610 | 3/2000 |
| JP | A-2001-136607 | 5/2001 |
| JP | A-2002-051405 | 2/2002 |
| JP | A-2002-354612 | 12/2002 |
| JP | A-2004-248433 | 9/2004 |
| JP | A-2005-061498 | 3/2005 |
| JP | A-2005-295772 | 10/2005 |

* cited by examiner

*Primary Examiner* — Bentsu Ro
*Assistant Examiner* — Erick Glass
(74) *Attorney, Agent, or Firm* — Oliff & Berridge, PLC.

(57) ABSTRACT

An object of the present invention is to suppress reverse of a vehicle on an up-hill road against an intention of a driver. A drive device for a vehicle according to the present invention includes: an estimator for estimating whether or not reverse of the vehicle occurs on an up-hill road; a rotating electric machine for generating electric power by rotation of a drive wheel in the vehicle when the vehicle reverses; a capacitor for electrically charging the electric power generated by the rotating electric machine; and a battery connected in parallel to the capacitor, wherein the estimator estimates that the reverse of the vehicle occurs when a current traveling road is an up-hill road and a vehicular speed is smaller than a threshold whereas the electric power of the capacitor is electrically discharged to the battery when the reverse of the vehicle is estimated and the amount of electric energy of the capacitor is greater than a certain threshold.

14 Claims, 6 Drawing Sheets

DRIVE DEVICE FOR VEHICLE

TECHNICAL FIELD

The present invention relates to a drive device for a vehicle provided with a rotating electric machine for traveling and, more particularly, to a technique for electrically charging a capacitor with electric power generated by a rotary electric machine.

BACKGROUND ART

Attention has been recently directed to a hybrid vehicle which travels by drive force from at least either one of an engine and a motor as part of measures for environmental issues. On such a hybrid vehicle is mounted a capacitor (i.e., a condenser) or the like for accumulating electric power to be supplied to the motor. Japanese Patent Laying-Open No. 2005-061498 discloses a hybrid vehicle having such a battery or such a capacitor mounted thereon.

The hybrid vehicle disclosed in Japanese Patent Laying-Open No. 2005-061498 includes: an engine; a first motor generator for exhibiting both of a function of an electric motor and a function of a power generator, a power distributing mechanism for distributing power of the engine to the first motor generator and a transmission shaft; a second motor generator connected to the transmission shaft, to exhibit both of the function of the electric motor and the function of the power generator; a transmission connected to the transmission shaft, to change and output the rotational speed of the transmission shaft; a drive shaft connected to an output shaft of the transmission via a differential; a drive wheel connected to the drive shaft; and a battery and a capacitor electrically connected to the first motor generator and the second motor generator via inverters, respectively.

In the hybrid vehicle disclosed in Japanese Patent Laying-Open No. 2005-061498, electric power accumulated in the battery and the capacitor is electrically discharged to the first motor generator and the second motor generator at the time of the start of the vehicle. In the meantime, regenerative electric power generated in the first motor generator and the second motor generator is electrically charged to the battery and the capacitor at the time of deceleration of the vehicle. The capacitor excellent in input/output characteristics more than the battery is used in a case where a large current is instantaneously generated during the electric charging/discharging. As a consequence, it is possible to suppress any up-sizing of the battery.

On the other hand, when a driver drives forward a vehicle at a standstill on an up-hill road by switching from a brake pedal to an acceleration pedal, the vehicle may be unexpectedly moved backward against an intention of the driver (such a phenomenon is referred to also "slip-down," but hereinafter simply referred to "reverse"). As soon as the vehicle is started to be reversed, the drive wheels also are started to be rotated in a direction of the reverse of the vehicle. The rotation of the drive wheels is transmitted to the first motor generator and the second motor generator via the drive shaft and the transmission, to thus generate electric power. The generation of the electric power produces torque for suppressing the rotation of the drive wheels (i.e., the reverse of the vehicle). In order to further increase the suppressing torque, it is necessary to efficiently consume the generated electric power at the time of the reverse. In the hybrid vehicle disclosed in Japanese Patent Laying-Open No. 2005-061498, the generated electric power at the time of the reverse can be electrically charged to the battery and the capacitor, and therefore, a greater suppressing torque can be expected in comparison with a case of the electric charging only to the battery.

However, in the hybrid vehicle disclosed in Japanese Patent Laying-Open No. 2005-061498, the generated electric power at the time of the reverse is electrically charged only to the battery when the capacitor is in a fully electrically charged state at the time of the reverse. Therefore, the smaller suppressing torque makes it difficult to suppress the reverse of the vehicle in comparison with a case of the electric discharging to both of the battery and the capacitor.

DISCLOSURE OF THE INVENTION

The present invention has been accomplished to solve the above-described problems. Therefore, an object of the present invention is to provide a drive device for a vehicle, in which the vehicle can be suppressed from reversing against an intention of a driver on an up-hill road.

A drive device for a vehicle according to the present invention includes: a drive shaft connected to a drive wheel of a vehicle; a rotating electric machine for traveling the vehicle, connected to the drive shaft, for generating electric power with rotation of the drive shaft when a reverse of the vehicle occurs on an up-hill road against an intention of a driver; a capacitor connected to the rotating electric machine, for electrically charging electric power generated by the rotating electric machine; and a control unit for controlling electric equipment including the rotating electric machine and the capacitor. The control unit estimates whether or not the reverse occurs, and electrically discharges electric power electrically charged to the capacitor when the occurrence of the reverse is estimated.

According to the above-described aspect, the drive wheel is started to be rotated backward of the vehicle when the vehicle reverses on the up-hill road against an intention of the driver. The drive shaft is rotated in association with the rotation of the drive wheel, and therefore, the rotating electric machine for allowing the vehicle to travel generates the electric power. The generation of the electric power generates torque for suppressing the rotation of the drive shaft, thereby suppressing the reverse of the vehicle. If the capacitor to be electrically charged by the electric power generated by the rotating electric machine is in a fully electrically charged state at the time of the reverse, power generation by the rotating electric machine is suppressed, and therefore, it is difficult to suppress the rotation of the drive shaft. In view of this, it is estimated whether or not the reverse occurs. If the occurrence of the reverse is estimated, the electric power electrically charged to the capacitor is electrically discharged. As a consequence, the capacitor comes into an electrically chargeable state before the reverse, and then, the capacitor can electrically charge a large electric power at the time of the reverse. In this manner, it is possible to increase the electric power generated by the rotating electric machine so as to increase the torque for suppressing the rotation of the drive shaft at the time of the reverse. Consequently, there can be provided the drive device capable of suppressing the reverse of the vehicle on the up-hill road against an intention of the driver.

Preferably, the control unit should calculate the amount of electric energy electrically charged to the capacitor, and should electrically discharge the electric power until the calculated amount of electric energy becomes a predetermined value or lower.

According to the above-described aspect, the amount of electric energy electrically charged to the capacitor is calculated. If the occurrence of the reverse is estimated, the electric power electrically charged to the capacitor is electrically discharged until the calculated amount of electric energy becomes the predetermined value or lower. Thus, the capacitor can electrically charge the large electric power at the time of the reverse by decreasing the amount of electric energy electrically charged to the capacitor before the reverse.

More preferably, the drive device should further include a secondary battery connected to the rotating electric machine in parallel to the capacitor. The control unit should electrically discharge the electric power of the capacitor in such a manner as to electrically charge the secondary battery.

According to the above-described aspect, the electric power electrically discharged by the capacitor at the time of the reverse is electrically charged to the secondary battery. As a consequence, it is possible to turn the capacitor into an electrically chargeable state by decreasing the electric power electrically charged to the capacitor without any waste of the electric power. Moreover, the secondary battery is connected to the rotating electric machine in parallel to the capacitor. Consequently, the electric power generated by the rotating electric machine at the time of the reverse can be electrically charged to the secondary battery in addition to the capacitor. In this manner, it is possible to further increase the electric power generated by the rotating electric machine at the time of the reverse, so as to further increase the torque for suppressing the rotation of the drive shaft.

Still more preferably, the rotating electric machine should include a first rotating electric machine and a second rotating electric machine connected to the drive shaft. The drive device should further include a gear mechanism provided with a first gear connected to the drive shaft, a second gear meshing with the first gear and being connected to an output shaft of an internal combustion engine for the vehicle, and a third gear meshing with the first gear via the second gear and being connected to a rotation shaft of the first rotating electric machine.

According to the above-described aspect, the rotation of the drive shaft at the time of the reverse allows the second rotating electric machine to be rotated. Furthermore, the rotation of the drive shaft is transmitted to the first gear, the second gear and the third gear, thereby rotating the first rotating electric machine. As a consequence, the first rotating electric machine also generates the electric power in addition to the second rotating electric machine. Therefore, it is possible to further increase the torque for suppressing the rotation of the drive shaft in comparison with a case where the electric power is generated by a single rotating electric machine.

A drive device for a vehicle according to another aspect of the present invention includes: an engine; a first rotating electric machine; a drive shaft connected to a drive wheel; a distributing mechanism connected to the engine, the first rotating electric machine and the drive shaft, for distributing power from the engine to the first rotating electric machine and the drive shaft; a second rotating electric machine connected to the drive shaft; a first inverter connected to the first rotating electric machine, for converting and outputting the electric power; a second inverter connected to the second rotating electric machine, for converting and outputting the electric power; a converter connected to the first inverter and the second inverter, for transforming and outputting a voltage; a secondary battery connected to the converter; a capacitor connected to the first inverter and the second inverter in parallel to the converter; and a control unit for controlling electric equipment including the first inverter, the second inverter and the converter. The control unit estimates whether or not a reverse of the vehicle occurs on an up-hill road against an intention of a driver, and controls the converter in such a manner as to step down a voltage input from the capacitor to output the voltage to the secondary battery when the occurrence of the reverse is estimated.

According to the above-described aspect, the drive wheel is started to be rotated backward of the vehicle when the vehicle reverses on the up-hill road against an intention of the driver. The drive shaft is rotated in association with the rotation of the drive wheel, and therefore, the second rotating electric machine connected to the drive shaft and the first rotating electric machine connected to the drive shaft via the distributing mechanism generates AC electric power. The generation of the electric power generates torque for suppressing the rotation of the drive shaft, thereby suppressing the reverse of the vehicle. The AC electric power generated by the first rotating electric machine and the second rotating electric machine is converted into DC electric power by the first inverter and the second inverter, respectively. The converted DC electric power is electrically charged to the capacitor, and further, the voltage is stepped down by the converter, to be electrically charged to the secondary battery. If the capacitor is in a fully electrically charged state at the time of the reverse, the converted DC electric power cannot be electrically charged to only the secondary battery. In view of this, the power generation by the first rotating electric machine and the second rotating electric machine is suppressed, and therefore, it is difficult to suppress the rotation of the drive shaft. In view of this, it is estimated whether or not the reverse occurs. If the occurrence of the reverse is estimated, the converter is controlled in such a manner as to step down the voltage input from the side of the capacitor, and then, to output it onto the side of the secondary battery. In this manner, the electric power at the capacitor is electrically discharged, and thus, the secondary battery is electrically charged. As a consequence, it is possible to turn the capacitor into an electrically chargeable state by decreasing the electric power electrically charged to the capacitor without any waste of the electric power before the reverse. Thus, the capacitor can electrically charge a large electric power at the time of the reverse. At the time of the reverse, it is possible to increase the electric power generated by the first rotating electric machine and the second rotating electric machine, so as to increase the torque for suppressing the rotation of the drive shaft. Consequently, there can be provided the drive device capable of suppressing the reverse of the vehicle on the up-hill road against an intention of the driver.

Preferably, the drive device should further include a voltmeter for detecting the voltage at the capacitor. The control unit should calculate the amount of electric energy electrically charged to the capacitor based on the voltage at the capacitor, and should control the converter by stepping down a voltage input from the capacitor to output the voltage to the secondary battery until the amount of electric energy electrically charged to the capacitor becomes a predetermined value or lower when the occurrence of the reverse is estimated.

According to the above-described aspect, the amount of electric energy electrically charged to the capacitor is calculated based on the voltage of the capacitor. If the occurrence of the reverse is estimated, the converter is controlled in such a manner as to step down the voltage to be input from the side of the capacitor, to output it onto the side of the secondary battery until the calculated amount of electric energy becomes the predetermined value or lower. Thus, the capacitor can electrically charge the large electric power at the time of the reverse by decreasing the amount of electric energy electrically charged to the capacitor before the reverse.

Still more preferably, the control unit should estimate whether or not the reverse occurs based on a gradient of the up-hill road, a brake pedaling force and a vehicular speed.

According to the above-described aspect, it is estimated whether or not the reverse occurs based on the gradient of the up-hill road, the brake pedaling force and the vehicular speed. For example, it is estimated that the reverse occurs when the vehicular speed is almost zero upon request for braking by the driver on the up-hill road whose gradient is greater than a predetermined value. Thus, it is possible to accurately estimate the occurrence of the reverse.

BEST MODE FOR CARRYING OUT THE INVENTION

Referring to the attached drawings, description will be made below on an embodiment according to the present invention. In the following description, the same component parts are designated by the same reference numerals whose names and functions are the same. Therefore, detailed description thereof will not be repeated below.

First Embodiment

Figure 1:
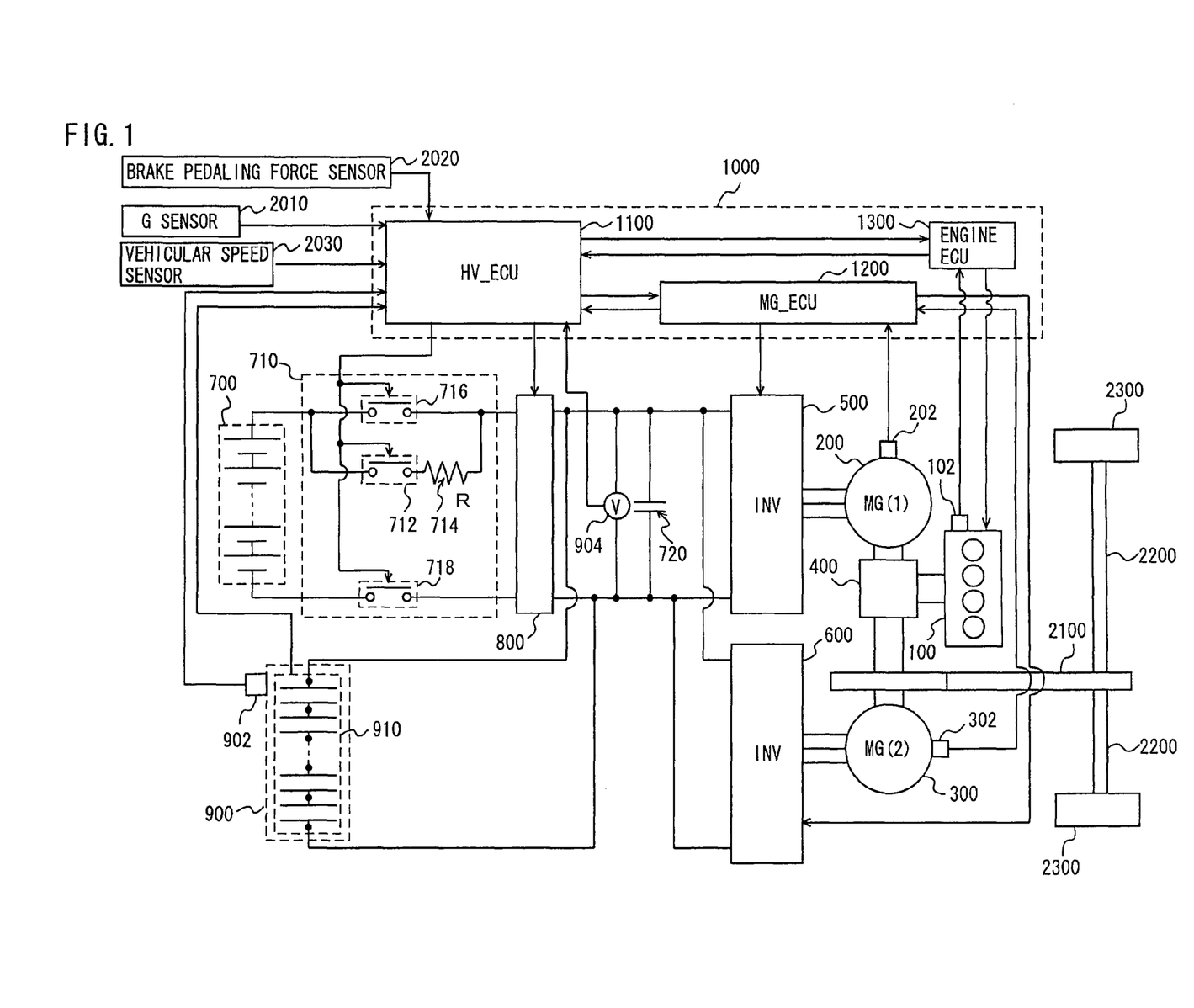
FIG. 1 is a diagram illustrating a structure of a vehicle having a drive device mounted thereon in an embodiment according to the present invention.

Referring to FIG. 1, description will be given below of a hybrid vehicle having a drive device mounted thereon in the present embodiment. The vehicle includes: an engine 100, an MG (abbreviating "a motor generator") (1) 200, an MG (2) 300, a power split device 400, an inverter (1) 500, an inverter (2) 600, a battery 700, a converter 800, a capacitor 900, a speed reducer 2100, a drive shaft 2200 and drive wheels 2300. The vehicle travels with drive force from at least either one of engine 100 and MG (2) 300.

Engine 100, MG (1) 200 and MG (2) 300 are connected to each other via power split device 400. Power generated by engine 100 is split into two channels by power split device 400. On one of the channels, drive wheels 2300 are driven via speed reducer 2100 and drive shaft 2200. On the other channel, MG (1) 200 is driven, thereby generating electric power.

MG (1) 200 is a three-phase AC motor. MG (1) 200 generates the electric power by the power of engine 100, split by power split device 400. Here, the use of the electric power generated by MG (1) 200 is varied according to a traveling condition of the vehicle or an SOC (abbreviating a "state of change") of battery 700. The electric power generated by MG (1) 200 is used as electric power for driving MG (2) 300 as it is, for example, during normal traveling. In contrast, when the SOC of battery 700 is lower than a predetermined value, the electric power generated by MG (1) 200 is converted from an AC to a DC by inverter (1) 500. Thereafter, a voltage is regulated by converter 800, to be then accumulated in battery 700: otherwise, no voltage is regulated, to be then accumulated in capacitor 900.

MG (2) 300 is a three-phase AC motor. MG (2) 300 is driven by at least any one of the electric power accumulated in battery 700, the electric power accumulated in capacitor 900 and the electric power generated by MG (1) 200. To MG (2) 300 is supplied electric power converted from a DC to an AC by inverter (2) 600.

The drive force of MG (2) 300 is transmitted to drive wheels 2300 via speed reducer 2100 and drive shaft 2200. As a consequence, MG (2) 300 assists engine 100 or allows the vehicle to travel by its drive force.

In the meantime, MG (2) 300 is driven by drive wheels 2300 via speed reducer 2100 during regenerative braking of the hybrid vehicle, to be thus actuated as a power generator. In this way, MG (2) 300 acts as a regenerative brake for converting braking energy into electric power. The electric power generated by MG (2) 300 is accumulated in battery 700 or capacitor 900 via inverter (2) 600.

Battery 700 is a combined battery constituted by connecting, in series, a plurality of battery modules having a plurality of battery cells integrated with each other. A discharging voltage and a charging voltage from and to battery 700 are regulated by converter 800.

A smoothing capacitor 720 is connected in parallel to inverter (1) 500 and inverter (2) 600. Smoothing capacitor 720 temporarily accumulates electric charges therein in order to smooth the electric power supplied from battery 700 or the electric power supplied from inverter (1) 500 or inverter (2) 600. The smoothed electric power is supplied to inverter (1) 500, inverter (2) 600 or battery 700.

A system main relay 710 is constituted of an SMR (1) 712 and an SMR (2) 716 on a positive electrode side and an SMR (3) 718 on a negative electrode side. SMR (1) 712, SMR (2) 716 and SMR (3) 718 are relays for closing a contact which is turned on upon energization of an excitation current with respect to a coil. SMR (1) 712 and SMR (2) 716 are disposed on the positive electrode side. Moreover, SMR (1) 712 and SMR (2) 716 are connected in parallel to each other. To SMR (1) 712 is connected a limitation resistor 714 in series. In order to prevent any inrush current from flowing in inverter (1) 500 or inverter (2) 600, SMR (1) 712 is connected before the connection of SMR (2) 716, thereby pre-charging smoothing capacitor 720. SMR (2) 716 is an SMR on the positive side, connected after the connection of SMR (1) 712 and the completion of the pre-charging. SMR (3) 718 is an SMR on the negative side, disposed on the negative electrode side of battery 700. Each of the SMRs is controlled by an ECU (abbreviating "an electronic control unit") 1000.

During the turning-on of a power source (i.e., when a position of an ignition switch is changed over from an OFF position to an STA position), ECU 1000 first turns on SMR (3) 718, and then, turns on SMR (1) 712, thereby carrying out the pre-charging of smoothing capacitor 720. Since limitation resistor 714 is connected to SMR (1) 712, a voltage applied to smoothing capacitor 720 is moderately increased even if SMR (1) 712 is turned on, thereby preventing any generation of an inrush current in inverter (1) 500 or inverter (2) 600. After the pre-charging is carried out, ECU 1000 turns on SMR (2) 716.

In contrast, during the turning-off of the power source (i.e., when the position of the ignition switch is changed over from the STA position to the OFF position), ECU 1000 turns off SMR (1) 712, SMR (2) 716 and SMR (3) 718, so as to prevent any leakage of the current from battery 700.

Capacitor 900 is constituted by connecting a plurality of cells in parallel to each other. Here, capacitor 900 may be constituted by connecting some cells in series in order to enhance withstand voltage performance.

ECU 1000 controls engine 100, inverter (1) 500, inverter (2) 600 and converter 800. ECU 1000 includes an HV (abbreviating "a hybrid vehicle")_ECU 1100, an MG_ECU 1200 and an engine ECU 1300.

Into HV_ECU 1100 are input a signal representing a temperature of capacitor 900 from a temperature sensor 902 and a signal representing a voltage of capacitor 900 from a capacitor voltmeter 904. Furthermore, into HV_ECU 1100 are input a signal representing a gradient G of a traveling road from a G sensor 2010, a signal representing a brake pedaling force from a brake pedaling force sensor 2020 and a signal representing a vehicular speed V from a vehicular speed sensor 2030, respectively.

In addition, HV_ECU 1100 is connected to a base plate 910, to which terminals of the capacitor cells are grounded, thereby detecting a voltage of each of the capacitor cells via the base plate 910. Here, a voltmeter may be disposed in each of the capacitor cells in place of the detection of the voltage of each of the capacitor cells by the use of the base plate 910.

HV_ECU 1100 calculates an electrically charging/discharging power to battery 700 and capacitor 900 based on vehicular speed V, an accelerator pedal position or the brake pedaling force. Additionally, HV_ECU 1100 calculates an electrically charging power limit value (a maximum value of electric power to be electrically charged) WIN(B) and an electrically discharging power limit value (a maximum value of electric power to be electrically discharged) WOUT(B) to battery 700 based on the temperature of battery 700 or the SOC.

In the same manner, HV_ECU 1100 calculates an electrically charging power limit value WIN(C) and an electrically discharging power limit value WOUT(C) to capacitor 900 based on the temperature or voltage of capacitor 900.

Into MG_ECU 1200 are input a signal representing the rotational speed of MG (1) 200 from a rotational speed sensor 202 and a signal representing the rotational speed of MG (2) 300 from a rotational speed sensor 302. Into engine ECU 1300 is input a signal representing the rotational speed of engine 100 from a rotational speed sensor 102.

HV_ECU 1100, MG_ECU 1200 and engine ECU 1300 are connected to each other in such a manner as to freely transmit and receive the signals to and from each other. HV_ECU 1100 calculates request output values to engine 100, MG (1) 200 and MG (2) 300 based on the signals input into the ECUs or a program and a map stored in a memory (not shown). At this time, HV_ECU 1100 calculates the request output values to MG (1) 200 and MG (2) 300 such that the sum of values of the electric power generated by MG (1) 200 and MG (2) 300 never exceeds the sum of electrically charging power limit value WIN(B) and electrically charging power limit value WIN(C).

MG_ECU 1200 controls inverter (1) 500 and inverter (2) 600 based on the request output values to MG (1) 200 and MG (2) 300, thereby controlling MG (1) 200 and MG (2) 300.

Engine ECU 1300 controls engine 100 based on the request output value to engine 100.

In the present embodiment, the electrically charging/discharging of battery 700 and the electrically charging/discharging of capacitor 900 are controlled by changing an output voltage (i.e., a system voltage) of converter 800.

For example, in a case where the electric power is supplied to MG (1) 200 or MG (2) 300, capacitor 900 is electrically discharged by priority by setting the output voltage of converter 800 lower than the voltage of capacitor 900. In contrast, battery 700 is electrically discharged by priority by setting the output voltage of converter 800 higher than the voltage of capacitor 900.

On the other hand, in a case where the electric power generated by MG (1) 200 or MG (2) 300 is electrically charged to battery 700 or capacitor 900, battery 700 is electrically charged by priority by setting the output voltage of converter 800 lower than the voltage of capacitor 900. In contrast, capacitor 900 is electrically charged by priority by setting the output voltage of converter 800 higher than the voltage of capacitor 900.

Moreover, HV_ECU 1100 controls converter 800, and then, distributes the electric power generated by MG (1) 200 or MG (2) 300 to capacitor 900 and battery 700 in such a manner that an electric charging power value P(C) of capacitor 900 and an electric charging power value P(B) of battery 700 never exceed their limitation values. Consequently, capacitor 900 and battery 700 can be suppressed from being turned to overcurrent and overvoltage states.

Figure 2:
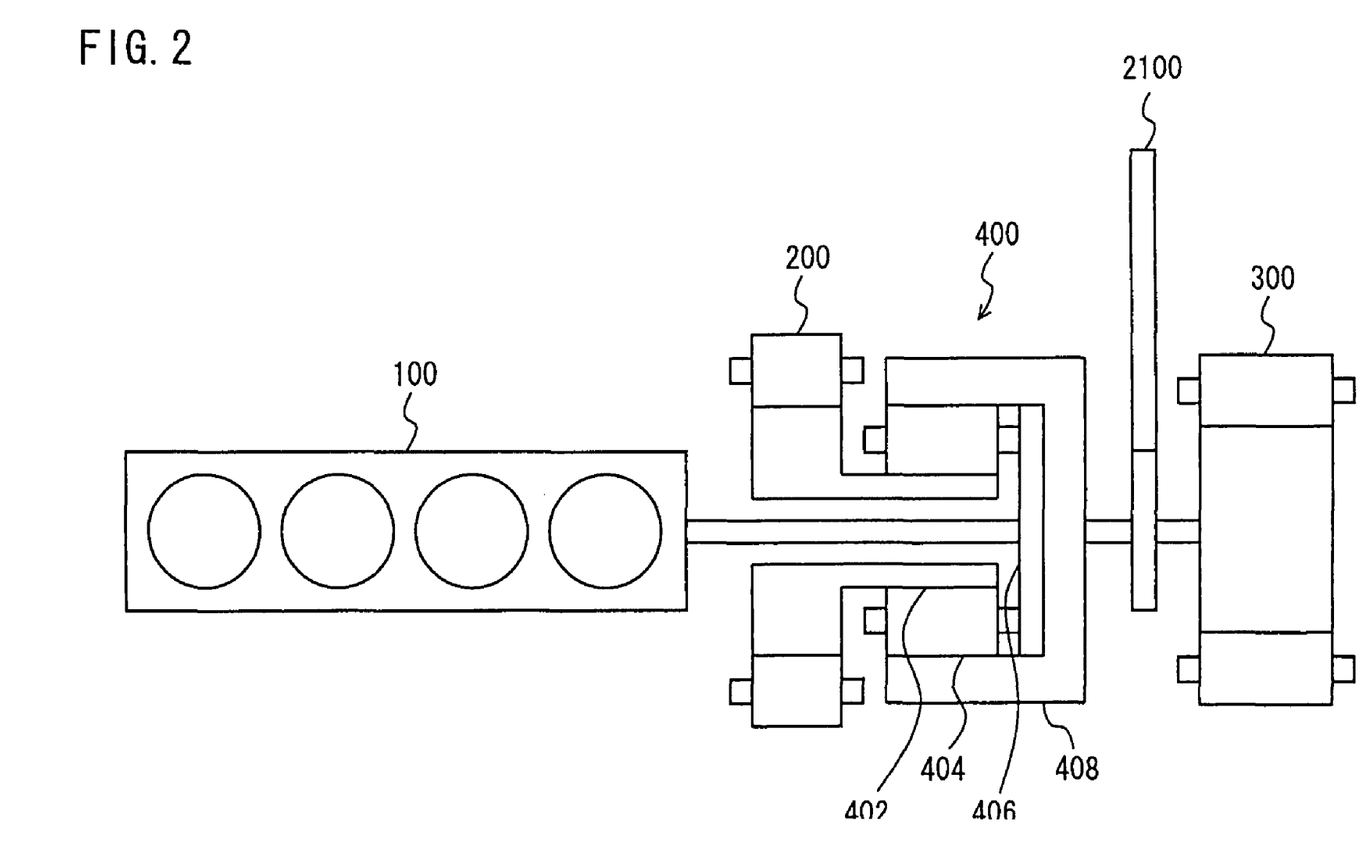
FIG. 2 is a diagram illustrating a power split device for the vehicle having the drive device mounted thereon in the embodiment according to the present invention.

With reference to FIG. 2, description will be further made on power split device 400. Power split device 400 is constituted of a planetary gear including a sun gear 402, a pinion gear 404, a carrier 406 and a ring gear 408.

Pinion gear 404 meshes with sun gear 402 and ring gear 408. Carrier 406 rotatably supports pinion gear 404. Sun gear 402 is connected to a rotation shaft of MG (1) 200. Carrier 406 is connected to a crankshaft of engine 100. Ring gear 408 is connected to a rotation shaft of MG (2) 300 and speed reducer 2100.

Figure 3:
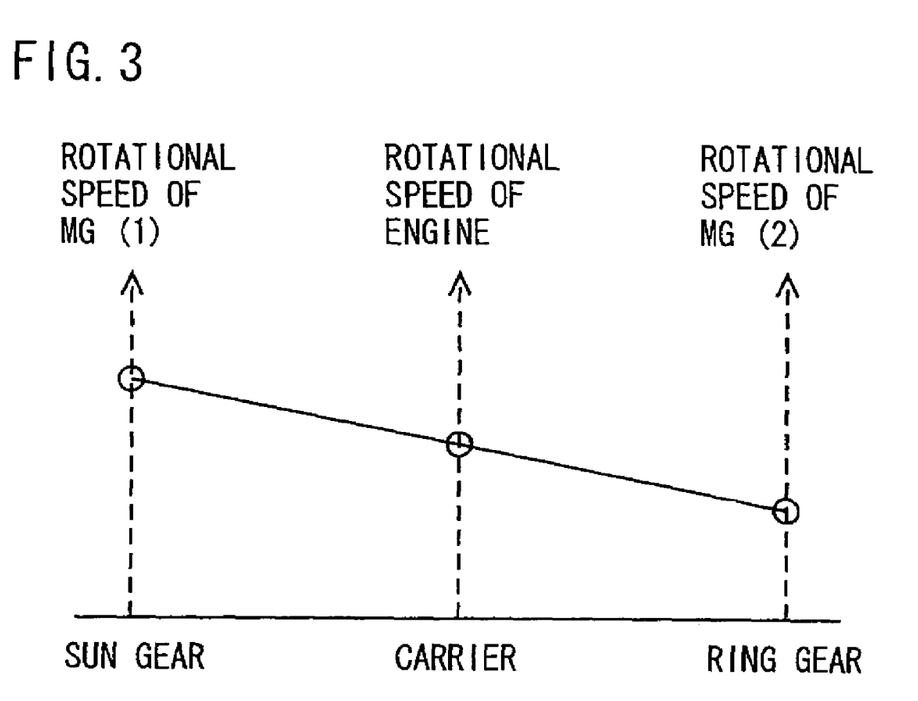
FIG. 3 is a collinear chart illustrating the interrelationship among rotational speeds of an engine, an MG (1) and an MG (2) in the vehicle having the drive device mounted thereon in the embodiment according to the present invention.

Since engine 100, MG (1) 200 and MG (2) 300 are connected to each other via power split device 400 constituted of the planetary gear, the rotational speeds of engine 100, MG (1) 200 and MG (2) 300 have an interrelationship of connection on a straight line in a collinear chart, as illustrated in FIG. 3.

When the vehicle reverses on an up-hill road against an intention of a driver in the present embodiment, drive wheels 2300 are started to be rotated in a vehicle reverse direction. The rotation of drive wheels 2300 is transmitted to MG (2) 300 via drive shaft 2200 and speed reducer 2100. In addition, the rotation of drive wheels 2300 is transmitted to MG (1) 200 via ring gear 408, pinion gear 404 and sun gear 402. In this manner, MG (1) 200 and MG (2) 300 generate the electric power owing to the rotation. This power generation allows torque for suppressing the reverse of the vehicle (i.e., a reverse suppressing torque) to be generated.

Figure 4:
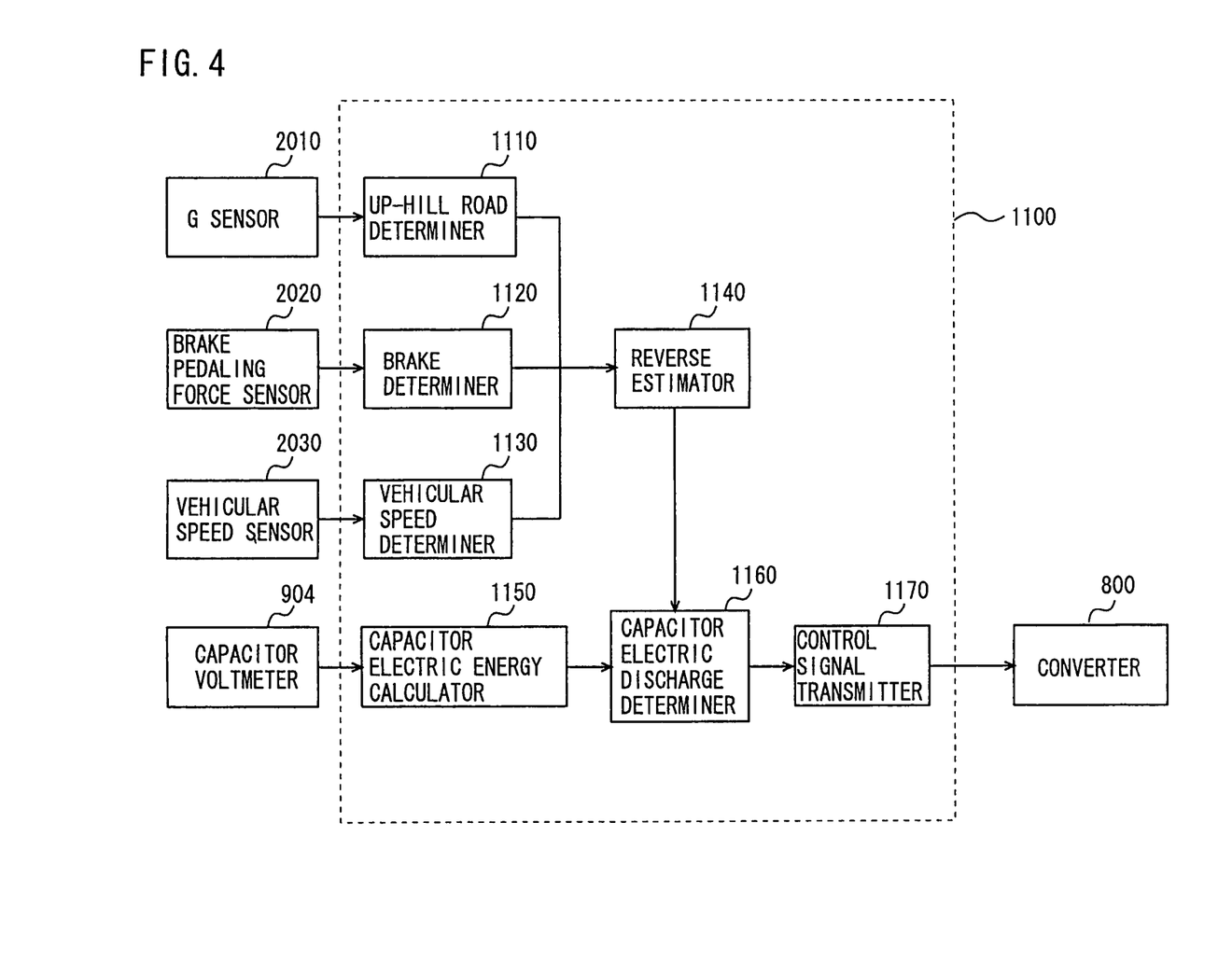
FIG. 4 is a functional block diagram illustrating the drive device in the embodiment according to the present invention.

Referring to FIG. 4, description will be made on a function of suppressing the reverse of the vehicle by HV_ECU 1100 constituting the drive device in the present embodiment.

HV_ECU 1100 includes an up-hill road determiner 1110, a brake determiner 1120, a vehicular speed determiner 1130, a reverse estimator 1140, a capacitor electric energy calculator 1150, a capacitor electric discharge determiner 1160 and a control signal transmitter 1170.

Up-hill road determiner 1110 detects gradient G in response to the signal from G sensor 2010, thereby determining whether or not a current traveling road is an up-hill road.

Brake determiner 1120 detects the brake pedaling force in response to the signal from brake pedaling force sensor 2020, thereby determining whether or not a brake is turned on.

Vehicular speed determiner 1130 detects vehicular speed V in response to the signal from vehicular speed sensor 2030, thereby determining whether or not vehicular speed V is lower than a predetermined threshold V (0).

Reverse estimator 1140 estimates the reverse of the vehicle which may occur within a reasonably short period of time based on the determination results of up-hill road determiner 1110, brake determiner 1120 and vehicular speed determiner 1130.

Capacitor electric energy calculator 1150 detects a capacitor voltage in response to the signal from capacitor voltmeter 904, thereby calculating amount Q of electric energy electrically charged to capacitor 900.

Capacitor electric discharge determiner 1160 determines whether or not the electric discharging is performed from capacitor 900 to battery 700 based on amount Q of electric energy calculated by capacitor electric energy calculator 1150 when reverse estimator 1140 estimates the reverse of the vehicle.

Control signal transmitter 1170 transmits, to converter 800, a control signal which allows the voltage on the side of capacitor 900 to be stepped down to a rated voltage of battery 700, so as to output it toward battery 700 when capacitor electric discharge determiner 1160 determines that the electric discharging is performed from capacitor 900 to battery 700. Thus, the electric power electrically charged to capacitor 900 is supplied to battery 700.

In the present embodiment, these functions are implemented in accordance with the program to be executed by HV_ECU 1100 (this program may be recorded on a recording medium, and then, may be distributed in a market). Incidentally, these functions may be constituted of not the program (i.e., software) but hardware.

Figure 5:
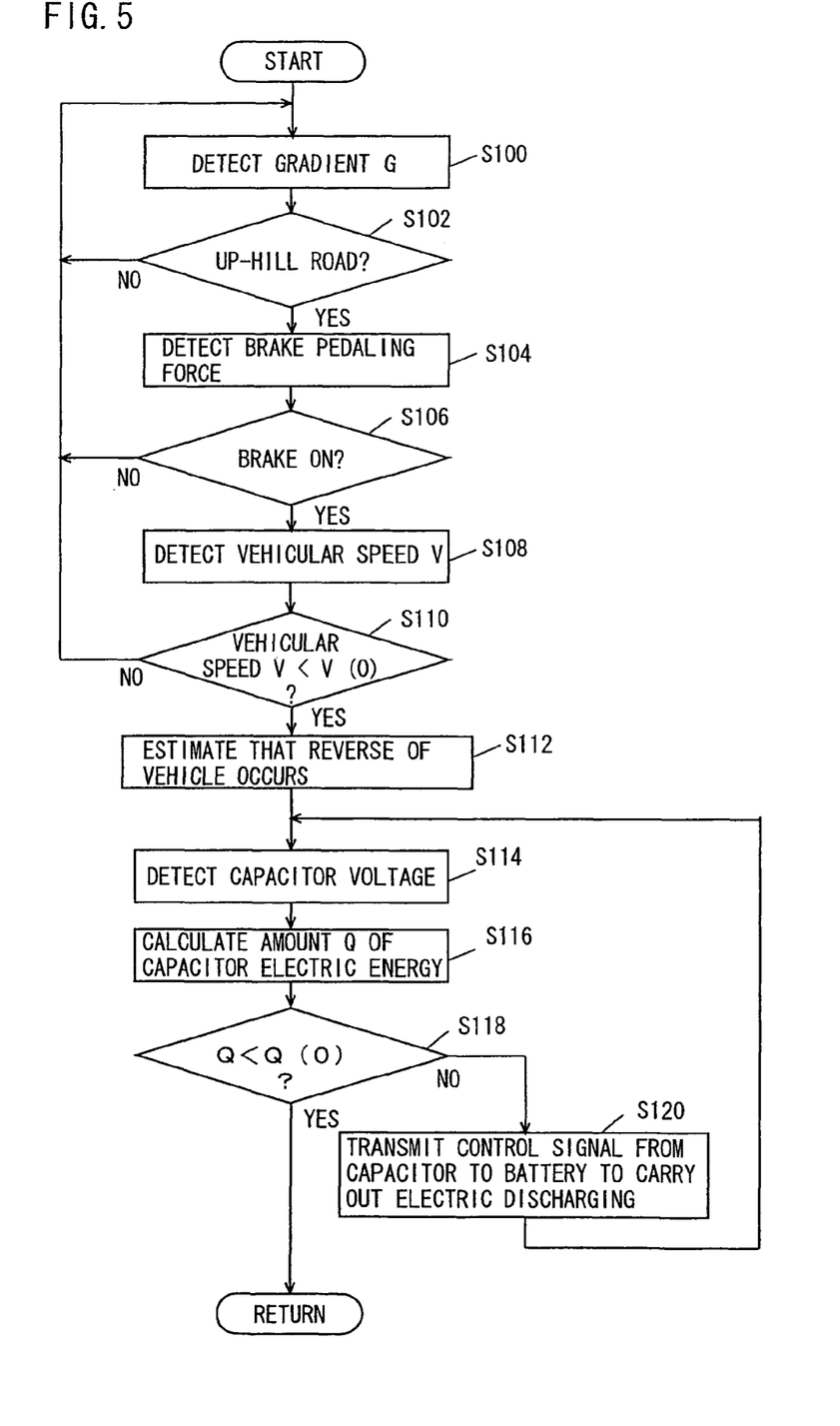
FIG. 5 is a flowchart illustrating a control structure of an ECU constituting the drive device in the embodiment according to the present invention.

With reference to FIG. 5, description will be given of a control structure of the program implemented by HV_ECU 1100 constituting the drive device in the present embodiment when the reverse of the vehicle is suppressed.

In step (a step will be hereinafter abbreviated as "S") 100, HV_ECU 1100 detects gradient G in response to the signal from G sensor 2010.

In S102, HV_ECU 1100 determines based on gradient G whether or not the current traveling road is the up-hill road. HV_ECU 1100 determines that the current traveling road is the up-hill road in a case of, for example, the signal representing that gradient G is higher than the predetermined threshold. If the current traveling road is the up-hill road (YES in S102), the processing proceeds to S104. In contrast, if otherwise (NO in S102), the processing returns to S100.

In S104, HV_ECU 1100 detects the brake pedaling force in response to the signal from brake pedaling force sensor 2020.

In S106, HV_ECU 1100 determines based on the brake pedaling force whether or not the brake is turned on. HV_ECU 1100 determines that the brake is turned on in a case where the brake pedaling force is higher than the predetermined threshold. If the brake is turned on (YES in S106), the processing proceeds to S108. In contrast, if otherwise (NO in S106), the processing returns to S100.

In S108, HV_ECU 1100 detects vehicular speed V in response to the signal from vehicular speed sensor 2030.

In S110, HV_ECU 1100 determines whether or not vehicular speed V is lower than predetermined threshold V (0). Threshold V (0) is set to be substantially zero. When vehicular speed V is lower than threshold V (0), the vehicle is in an almost standstill state. If vehicular speed V is lower than threshold V (0) (YES in S110), the processing proceeds to S112. In contrast, if otherwise (NO in S110), the processing returns to S100.

In S112, HV_ECU 1100 estimates that the reverse of the vehicle occurs within a reasonably short period of time.

In S114, HV_ECU 1100 detects the capacitor voltage in response to the signal from capacitor voltmeter 904.

In S116, HV_ECU 1100 calculates amount Q of capacitor electric energy based on the capacitor voltage. Here, HV_ECU 1100 calculates amount Q of capacitor electric energy based on the amount of capacitor electric charges calculated based on the capacitor voltage. Incidentally, the amount of capacitor electric charges is calculated in accordance with an inequality of C×(the square of the capacitor voltage)/2, where C designates a capacitance of capacitor 900.

In S118, HV_ECU 1100 determines whether or not amount Q of capacitor electric energy is lower than predetermined threshold Q (0). Threshold Q (0) is set to be substantially zero, for example. If amount Q of capacitor electric energy is lower than threshold Q (0) (YES in S118), the processing comes to an end. In contrast, if otherwise (NO in S118), the processing proceeds to S120.

In S120, HV_ECU 1100 transmits, to converter 800, a control signal which allows the voltage on the side of capacitor 900 to be stepped down to the rated voltage of battery 700, so as to output it to battery 700 in such a manner that the electric discharging is performed from capacitor 900 to battery 700.

With the above-described structure and based on the above-described flowchart, description will be made on operation of the drive device according to the present embodiment.

When the vehicle is started to reverse on the up-hill road against an intention of the driver, MG (1) 200 and MG (2) 300 generate the electric power. As a consequence, the greater reverse suppressing torque is generated in comparison with a case where the electric power is generated by a single motor generator. In order to further increase the reverse suppressing torque, MG (1) 200 and MG (2) 300 need generate the larger electric power.

Figure 6:
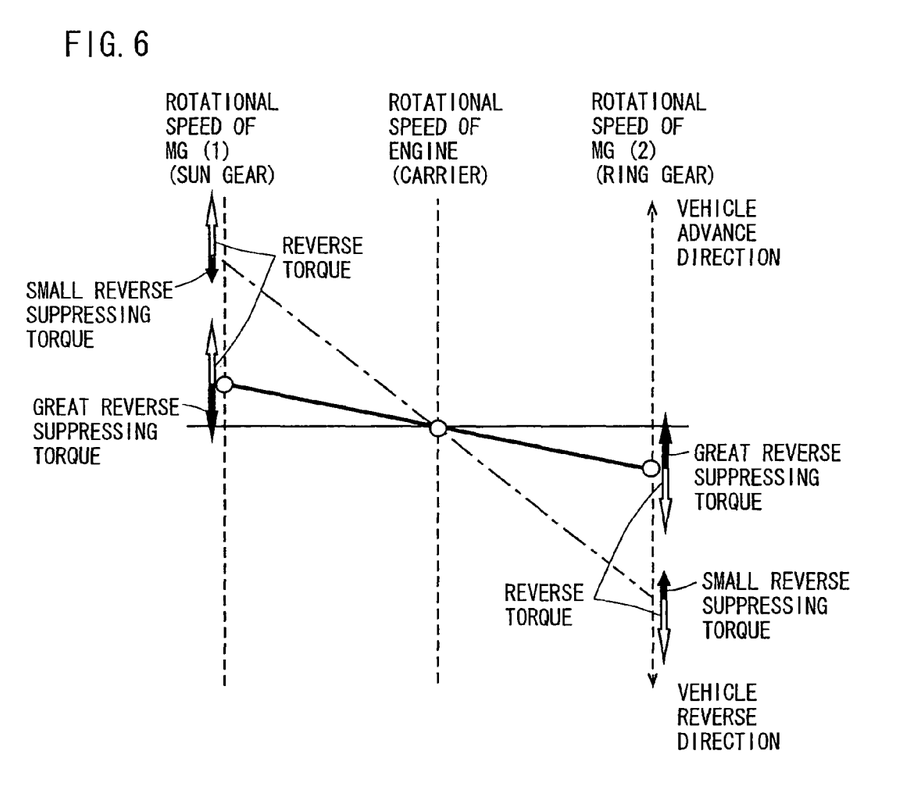
FIG. 6 is a chart illustrating the interrelationship among rotational speeds of the engine, the MG (1) and the MG (2) and torque acting on the vehicle in the vehicle having the drive device mounted thereon in the embodiment according to the present invention.

When capacitor 900 is in the fully electrically charged state during the reverse, the electric power generated by MG (1) 200 and MG (2) 300 can be electrically charged only to battery 700, thereby suppressing the power generation by MG (1) 200 and MG (2) 300. Therefore, the reverse suppressing torque becomes smaller, as indicated by an alternate long and short dashed line in FIG. 6, so that the vehicle reverses farther.

In view of the above, when the traveling road of the vehicle is the up-hill road (YES in S102), the brake is turned on (YES in S106) and the vehicle comes to an almost halt at vehicular speed V of substantially zero (YES in S110), it is estimated that the reverse of the vehicle occurs within a reasonably short period of time (S112). In response to the signal from capacitor voltmeter 904 is detected the capacitor voltage (S114), and thereafter, based on the capacitor voltage is calculated amount Q of capacitor electric energy (S116). If amount Q of capacitor electric energy is higher than predetermined threshold Q (0) (NO in S118), the electric power electrically charged to capacitor 900 is electrically discharged to battery 700 in preparation for the occurrence of the reverse (S120). The electric power electrically charged to capacitor 900 is electrically discharged to battery 700 (NO in S118, S120) until amount Q of capacitor electric energy becomes lower than predetermined threshold Q (0) (YES in S118).

Thus, it is possible to turn capacitor 900 into the electrically chargeable state without any waste of the electric power electrically charged to capacitor 900 before the reverse of the vehicle. In this way, the electric power generated in MG (1) 200 and MG (2) 300 during the reverse can be electrically charged to both of battery 700 and capacitor 900. Therefore, the greater suppressing torque can be generated in comparison with a case of the electric charging only by battery 700, as indicated by a solid line in FIG. 6, thereby suppressing the reverse of the vehicle.

Additionally, amount Q of capacitor electric energy becomes substantially zero at predetermined threshold Q (0). Therefore, the larger electric power can be electrically charged by capacitor 900 by decreasing amount Q of capacitor electric energy down to substantially zero before the reverse.

As described above, in the drive device according to the present embodiment, the capacitor can be turned into the electrically chargeable state by decreasing the electric power electrically charged to the capacitor in a case where the reverse of the vehicle is estimated. Therefore, the electric power generated in the MG (1) and the MG (2) can be electrically charged to both of the battery and the capacitor during the reverse. Therefore, the greater reverse suppressing torque can be generated in comparison with a case of the electric charging only by the battery, thereby suppressing the reverse of the vehicle.

It is to be understood that the embodiment described herein should be illustrative but not limitative at all points. It is to be intended that the scope of the present invention should fall under not the above-described embodiment but claims, and should further encompass all variations within significance and range equivalent to the claims.

The invention claimed is:

1. A drive device for a vehicle, comprising:
   a drive shaft connected to a drive wheel of a vehicle;
   a rotating electric machine for traveling said vehicle, connected to said drive shaft, for generating electric power with rotation of said drive shaft when a reverse of said vehicle occurs on an up-hill road against an intention of a driver;
   a capacitor connected to said rotating electric machine, for electrically charging electric power generated by said rotating electric machine; and
   a control unit for controlling electric equipment including said rotating electric machine and said capacitor; wherein
   said control unit estimates whether or not said reverse occurs, and
   electrically discharges electric power electrically charged to said capacitor when an occurrence of said reverse is estimated.

2. The drive device for a vehicle according to claim 1, wherein
   said control unit calculates an amount of electric energy electrically charged to said capacitor, and
   electrically discharges said electric power until said calculated amount of electric energy becomes a predetermined value or lower.

3. The drive device for a vehicle according to claim 1, further comprising a secondary battery connected to said rotating electric machine in parallel to said capacitor; wherein
   said control unit electrically discharges the electric power of said capacitor in such a manner as to electrically charge said secondary battery.

4. The drive device for a vehicle according to claim 1, wherein
   said rotating electric machine includes a first rotating electric machine and a second rotating electric machine connected to said drive shaft,
   said drive device further comprises a gear mechanism including a first gear connected to said drive shaft, a second gear meshing with said first gear and being connected to an output shaft of an internal combustion engine for said vehicle, and a third gear meshing with said first gear via said second gear and being connected to a rotation shaft of said first rotating electric machine.

5. The drive device for a vehicle according to claim 1, wherein said control unit estimates whether or not said reverse occurs based on a gradient of said up-hill road, a brake pedaling force and a vehicular speed.

6. A drive device for a vehicle, comprising:
   an engine;
   a first rotating electric machine;
   a drive shaft connected to a drive wheel;
   a distributing mechanism connected to said engine, said first rotating electric machine and said drive shaft, for distributing power from said engine to said first rotating electric machine and said drive shaft;
   a second rotating electric machine connected to said drive shaft;
   a first inverter connected to said first rotating electric machine, for converting and outputting electric power;
   a second inverter connected to said second rotating electric machine, for converting and outputting electric power;
   a converter connected to said first inverter and said second inverter, for transforming and outputting a voltage;
   a secondary battery connected to said converter;
   a capacitor connected to said first inverter and said second inverter in parallel to said converter; and
   a control unit for controlling electric equipment including said first inverter,
   said second inverter and said converter; wherein
   said control unit estimates whether or not a reverse of said vehicle occurs on an up-hill road against an intention of a driver, and
   controls said converter in such a manner as to step down a voltage input from said capacitor to output the voltage to said secondary battery when an occurrence of said reverse is estimated.

7. The drive device for a vehicle according to claim 6, further comprising a voltmeter for detecting a voltage at said capacitor, wherein
   said control unit calculates an amount of electric energy electrically charged to said capacitor based on the voltage at said capacitor, and
   controls said converter by stepping down a voltage input from said capacitor to output the voltage to said secondary battery until the amount of electric energy electrically charged to said capacitor becomes a predetermined value or lower when the occurrence of said reverse is estimated.

8. A drive device for a vehicle, comprising:
   a drive shaft connected to a drive wheel of a vehicle;
   a rotating electric machine for traveling said vehicle, connected to said drive shaft, for generating electric power with rotation of said drive shaft when a reverse of said vehicle occurs on an up-hill road against an intention of a driver;
   a capacitor connected to said rotating electric machine, for electrically charging electric power generated by said rotating electric machine; and
   control means for controlling electric equipment including said rotating electric machine and said capacitor; wherein
   said control means includes:
   estimating means for estimating whether or not said reverse occurs; and electrically discharging means for electrically discharging the electric power electrically charged to said capacitor when the occurrence of said reverse is estimated.

9. The drive device for a vehicle according to claim 8, wherein said control means further includes means for calculating the amount of electric energy electrically charged to said capacitor; and said electrically discharging means includes means for electrically discharging said electric power until said calculated amount of electric energy becomes a predetermined value or lower.

10. The drive device for a vehicle according to claim 8, further comprising a secondary battery connected to said rotating electric machine in parallel to said capacitor; wherein said electrically discharging means includes means for electrically discharging the electric power of said capacitor in such a manner as to electrically charge said secondary battery.

11. The drive device for a vehicle according to claim 8, wherein said rotating electric machine includes a first rotating electric machine and a second rotating electric machine connected to said drive shaft, said drive device further comprises a gear mechanism including a first gear connected to said drive shaft, a second gear meshing with said first gear and being connected to an output shaft of an internal combustion engine for said vehicle, and a third gear meshing with said first gear via said second gear and being connected to a rotation shaft of said first rotating electric machine.

12. The drive device for a vehicle according to claim 8, wherein said estimating means includes means for estimating whether or not said reverse occurs based on a gradient of said up-hill road, a brake pedaling force and a vehicular speed.

13. A drive device for a vehicle, comprising:
an engine;
a first rotating electric machine;
a drive shaft connected to a drive wheel;
a distributing mechanism connected to said engine, said first rotating electric machine and said drive shaft, for distributing power from said engine to said first rotating electric machine and said drive shaft;
a second rotating electric machine connected to said drive shaft;
a first inverter connected to said first rotating electric machine, for converting and outputting electric power;
a second inverter connected to said second rotating electric machine, for converting and outputting electric power;
a converter connected to said first inverter and said second inverter, for transforming and outputting a voltage;
a secondary battery connected to said converter;
a capacitor connected to said first inverter and said second inverter in parallel to said converter; and
a control unit for controlling electric equipment including said first inverter, said second inverter and said converter; wherein
said control unit includes:
estimating means for estimating whether or not a reverse of said vehicle occurs on an up-hill road against an intention of a driver; and
converter controlling means for controlling said converter by stepping down a voltage input from said capacitor to output the voltage to said secondary battery when the occurrence of said reverse is estimated.

14. The drive device for a vehicle according to claim 13, further comprising a voltmeter for detecting the voltage at said capacitor, wherein said control unit further includes means for calculating an amount of electric energy electrically charged to said capacitor based on the voltage at said capacitor; and said converter controlling means includes means for controlling said converter by stepping down a voltage input from said capacitor to output the voltage to said secondary battery until the amount of electric energy electrically charged to said capacitor becomes a predetermined value or lower when the occurrence of said reverse is estimated.

* * * * *

UNITED STATES PATENT AND TRADEMARK OFFICE
CERTIFICATE OF CORRECTION

PATENT NO. : 8,004,218 B2
APPLICATION NO. : 12/308860
DATED : August 23, 2011
INVENTOR(S) : Takaya Soma et al.

It is certified that error appears in the above-identified patent and that said Letters Patent is hereby corrected as shown below:

Title Page, Item (73) should read (73) Assignee: Toyota Jidosha Kabushiki Kaisha, Toyota (JP)

Signed and Sealed this
Fourth Day of September, 2012

David J. Kappos
*Director of the United States Patent and Trademark Office*